US007475252B2

(12) United States Patent
Jeffries et al.

(10) Patent No.: US 7,475,252 B2
(45) Date of Patent: Jan. 6, 2009

(54) SYSTEM, METHOD AND PROGRAM TO FILTER OUT LOGIN ATTEMPTS BY UNAUTHORIZED ENTITIES

(75) Inventors: Clark Debs Jeffries, Chapel Hill, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/918,523

(22) Filed: Aug. 12, 2004

(65) Prior Publication Data
US 2006/0037064 A1 Feb. 16, 2006

(51) Int. Cl.
*H04L 9/32* (2006.01)
(52) U.S. Cl. .............................. 713/184; 726/4; 726/28; 726/29; 726/30; 709/227; 713/168; 713/180
(58) Field of Classification Search .................. 713/184
See application file for complete search history.

(56) References Cited

U.S. PATENT DOCUMENTS 5,524,052 A 6/1996 Augustine et al. ............. 380/49

(Continued)

FOREIGN PATENT DOCUMENTS

EP 1030235 A2 8/2000

OTHER PUBLICATIONS

Mannan, M., et al, 'Using a Personal Device to Strengthen Password Authentication from an Untrusted Computer', Carleton Univ., Mar. 30, 2007, entire document, http://www.ccsl.carleton.ca/paper-archive/mpauth.pdf.*

(Continued)

*Primary Examiner*—Kristine Kincaid
*Assistant Examiner*—Ronald Baum
(74) *Attorney, Agent, or Firm*—Silvy Anna Murphy

(57) ABSTRACT

System, method and computer program for authenticating a user of a client computer to a remote server computer. A client computer initially sends a userID but not a password of the user to the remote server computer. In response to the userID, the server computer determines a subsequent time window during which the server computer will consider for authentication submission of a combination of the userID and a password. The server computer notifies the client computer of the time window. After receipt of the notification from the server computer, during the time window, the client computer sends the userID and a corresponding password to the server computer. In response to receipt of the userID and the corresponding password from the client computer, the server computer determines if the combination of the userID and the corresponding password is valid. If the combination of the userID and the corresponding password is valid, the server computer notifies the client computer that the combination of the userID and the corresponding password is valid. In response, the client computer establishes a session with the server computer and accesses a resource requiring a valid combination of userID and password to access. The server computer ignores combinations of userIDs and passwords submitted before or after the time window.

15 Claims, 3 Drawing Sheets

U.S. PATENT DOCUMENTS

| | | | | |
|---|---|---|---|---|
| 5,559,505 A | * | 9/1996 | McNair | 340/5.28 |
| 5,732,137 A | | 3/1998 | Azis | 380/25 |
| 6,311,276 B1 | | 10/2001 | Connery et al. | 713/201 |
| 6,601,175 B1 | * | 7/2003 | Arnold et al. | 726/7 |
| 7,043,640 B2 | * | 5/2006 | Pritchard et al. | 713/184 |
| 2002/0108046 A1 | | 8/2002 | Armingaud | 713/183 |
| 2002/0147930 A1 | * | 10/2002 | Pritchard et al. | 713/202 |
| 2002/0159601 A1 | | 10/2002 | Bushmitch et al. | 380/277 |
| 2003/0028812 A1 | | 2/2003 | Stultz et al. | 713/202 |
| 2003/0149900 A1 | * | 8/2003 | Glassman et al. | 713/202 |
| 2003/0172269 A1 | | 9/2003 | Newcombe | 713/168 |
| 2004/0010723 A1 | | 1/2004 | Zhang | 713/202 |

OTHER PUBLICATIONS

INSPEC Abstract No. C2002-05-7120-013 "Group-Access Control of confidential Files in E-Commerce Management Using Shared-Secret Scheme" Tan, E. C. Journal: electronic Commerce Research vo. 2 No. 1-2 p. 158-8.

INSPEC Abstract No. C9901-6130s-046 "Two Integrated Schemes of User Authentication and Access Control In A Distributed Computer Network" Journal: IEE Proceedings-computers & Digital Techniques vol. 1345, No. 6 p. 419-24.

* cited by examiner

SYSTEM, METHOD AND PROGRAM TO FILTER OUT LOGIN ATTEMPTS BY UNAUTHORIZED ENTITIES

BACKGROUND OF THE INVENTION

The invention relates generally to computer systems, and deals more particularly with a system, method and program to filter out login attempts by hackers and other unauthorized entities.

It is well known today that a valid combination of userID and password (or other password information) are typically required for secure access to protected resources. Such resources include files, databases, computer programs, computer systems and networks. In many cases, a server computer is responsible for granting access to a remote user based on a valid combination of userID and password supplied by the user's "client" computer. The userID and password are especially important when the access to the remote server computer is via an insecure network, such as the Internet. In such cases, a "hacker" or other unauthorized entity may flood the remote server with random or semi-random combinations of userIDs and passwords, hoping that one combination is valid to enable the hacker to access the protected resource. Security is improved by ensuring that authorized entities avoid use of predictable passwords such as "passwd", "login" or common names. Security is also improved by limiting dissemination of the valid userIDs if possible, although only the password is considered to be secret.

A known solution is for the remote server to track and limit the number of login attempts by each userID. If there are more than a specified number of login attempts by a certain userID within a specified period of time, then the remote server "disables" the userID, i.e. the remote server will ignore the excess login attempts, will not attempt to authenticate the combination of userID and password (or other password information) and will not allow access by the userID to the protected resource even if a valid password is supplied. Because the number of possible passwords is typically high, the hacker is unlikely statistically to furnish a valid combination of userID and password within the foregoing constraints. This disablement of the userID may continue until the real user contacts an administrator to explain the situation and reestablish his or her authorization.

Another known solution is for the remote server to limit the rate at which it replies to submissions by the client of combinations of userIDs and passwords. Consequently, the rate at which the client can furnish different combinations of userIDs and passwords is limited. Because the number of possible passwords is typically high, it is unlikely statistically that the hacker can furnish a valid combination of userID and password before an administrator or security tool detects the attack.

There are also various types of "denial of service" attacks that are known today. In a "global" type of denial of service attacks, a hacker may attempt to flood a remote server with work requests in an attempt to overload the server to prevent it from servicing any of its authorized clients. A global denial of service attack is generally expensive for the hacker to implement and easy to detect by an administrator, although service may be impaired before the attack is detected and fixed. In a "focussed" type of denial of service attack, the hacker attempts to deny service to one or a few clients or users. For example, if a hacker floods a remote server with invalid combinations of a single, valid userID and different, invalid passwords, typically the server will "disable" the userID after a certain number of unsuccessful attempts, as explained above. While the hacker will not gain access to the remote server, this attack will nevertheless prevent the real owner of this userID from accessing the protected resource until the real owner contacts an administrator and reestablishes his or her authorization. A focussed denial of service attack is generally less expensive for the hacker to implement because lesser network traffic is required. Also, a focussed denial of service attack is typically more difficult for an administrator to detect because less network traffic is involved.

As explained above, the requirement for a valid combination of userID and password make it difficult for a hacker to gain access to protected resources. Also, the known techniques to prevent hackers from flooding a server with random combinations of userIDs and passwords further protect the resources from unauthorized access. However, further improvement to prevent unauthorized access would be valuable. Also, these known techniques make possible the focussed denial of service attack as described above.

Accordingly, an object of the present invention is to make it difficult for a hacker to access a protected resource.

Another object of the present invention is to make it difficult for a hacker to promulgate a focussed denial of service attack intended to prevent a legitimate user from accessing a protected resource.

SUMMARY OF THE INVENTION

The invention resides in a system, method and computer program for authenticating a user of a client computer to a remote server computer. A client computer initially sends a userID but not a password or other authentication of the user to the remote server computer. In response to the userID without said password or other authentication, the server computer determines a subsequent time window during which the server computer will consider for authentication submission of a combination of the userID and a password or other authentication. The server computer notifies the client computer of the time window. After receipt of the notification from the server computer, during the time window, the client computer sends the userID and a corresponding password or other authentication to the server computer. In response to receipt of the userID and the corresponding password or other authentication from the client computer, the server computer determines if the combination of the userID and the corresponding password or other authentication is valid. If the combination of the userID and the corresponding password or other authentication is valid, the server computer notifies the client computer that the combination of the userID and the corresponding password or other authentication is valid. In response, the client computer establishes a session with the server computer and accesses a resource requiring a valid combination of userID and password or other authentication to access.

According to features of the present invention, the server computer ignores combinations of userIDs and passwords submitted before or after the time window. Also, the server computer limits the number of combinations of userIDs and passwords submitted during the time window that the server computer will consider for login.

DETAILED DESCRIPTION OF THE PREFERRED EMBODIMENTS OF THE PRESENT INVENTION

Figure 1:
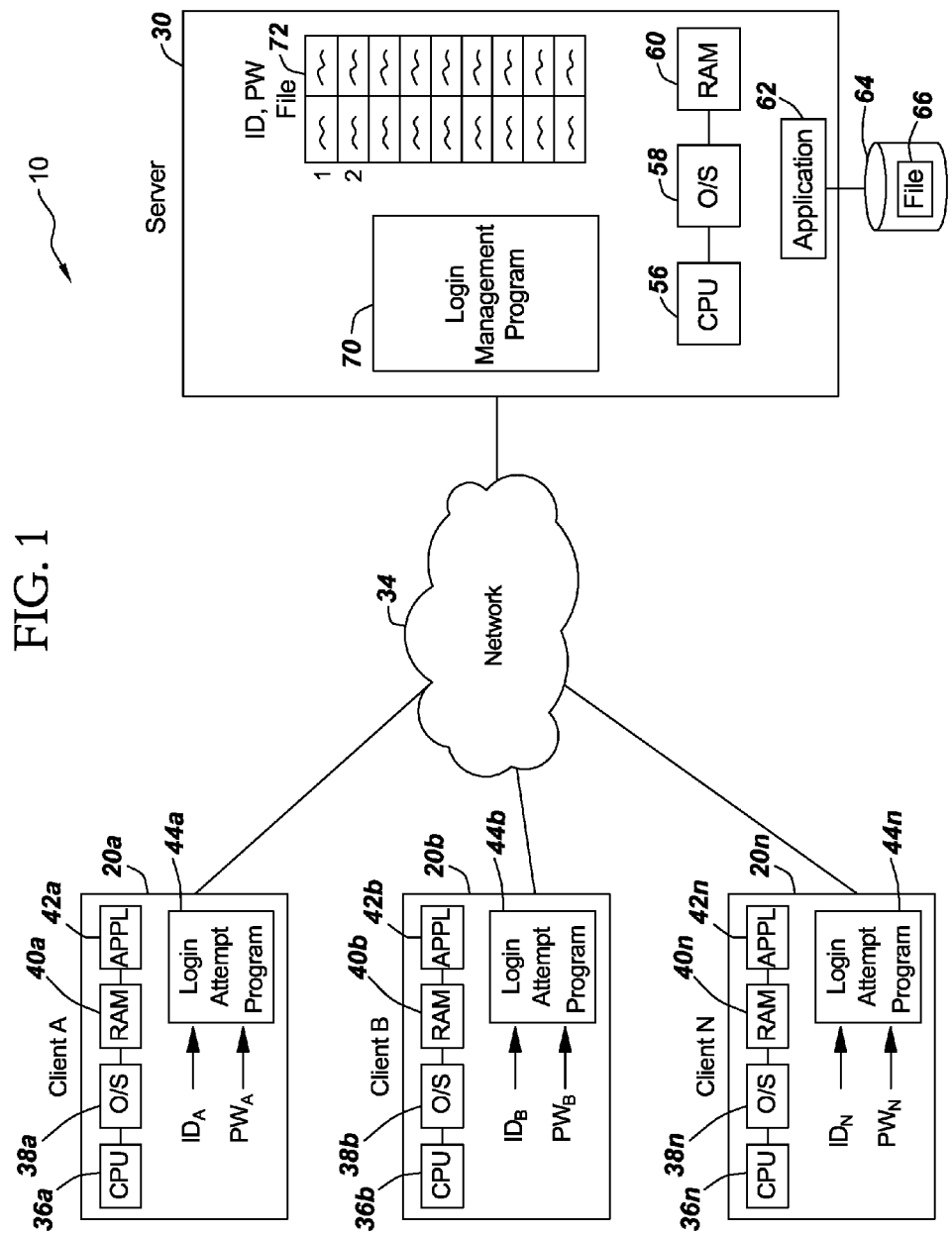
FIG. 1 is a block diagram of a computer system which includes the present invention.

The present invention will now be described in detail with reference to the figures. FIG. 1 illustrates a computer system generally designated 10 which includes the present invention. System 10 comprises a multiplicity of client computers 20a, b, . . . n (called "clients" for short) and a remote server computer 30 (called "server" for short) interconnected to the clients by a network 34. By way of example, the network 34 is the Internet or any other public or private networking technology. Each of the clients 20a,b . . . n includes a respective CPU 36a,b . . . n, operating system 38a,b . . . n, RAM 40a,b . . . n and application 42a,b . . . n. Each of the applications 42a,b . . . n can be a web browser or other communication application to permit the respective client computers 20a,b . . . n to communicate with the server 30. Applications 42a,b . . . n include respective login attempt programs 44a,b . . . n to attempt to login to server 30 at the request of their respective users. In accordance with the present invention and described in more detail below, the login attempt programs 44a,b . . . n are limited to a time "window" when they can supply a password or other authentication to server 30 to attempt the login. Login attempts before and after the window by anyone, including the real user and unauthorized entities, are ignored. If the login attempt is successful, the server notifies the client, and the client can establish a session with server 30 and use the session to access a protected resource 66 managed by server 30. The protected resource 66 can be a file, database, computer program, computer system or network. The resource 66 is "protected" in the sense that a valid combination of userID and password or other password or authentication are required to access the resource 66. The server 30 includes a CPU 56, operating system 58, RAM 60 and database management application 62 which manages protected resource 66 located either in RAM 60 or a storage 64. In the illustrated state, the protected resource 66 is a file which resides in storage 64, but can be copied into and managed in RAM 60. Server 30 also includes a login management program 70 which interacts with the login attempt programs 44a,b . . . n to restrict the login attempts to the time window, as described above and below.

Figure 2A:
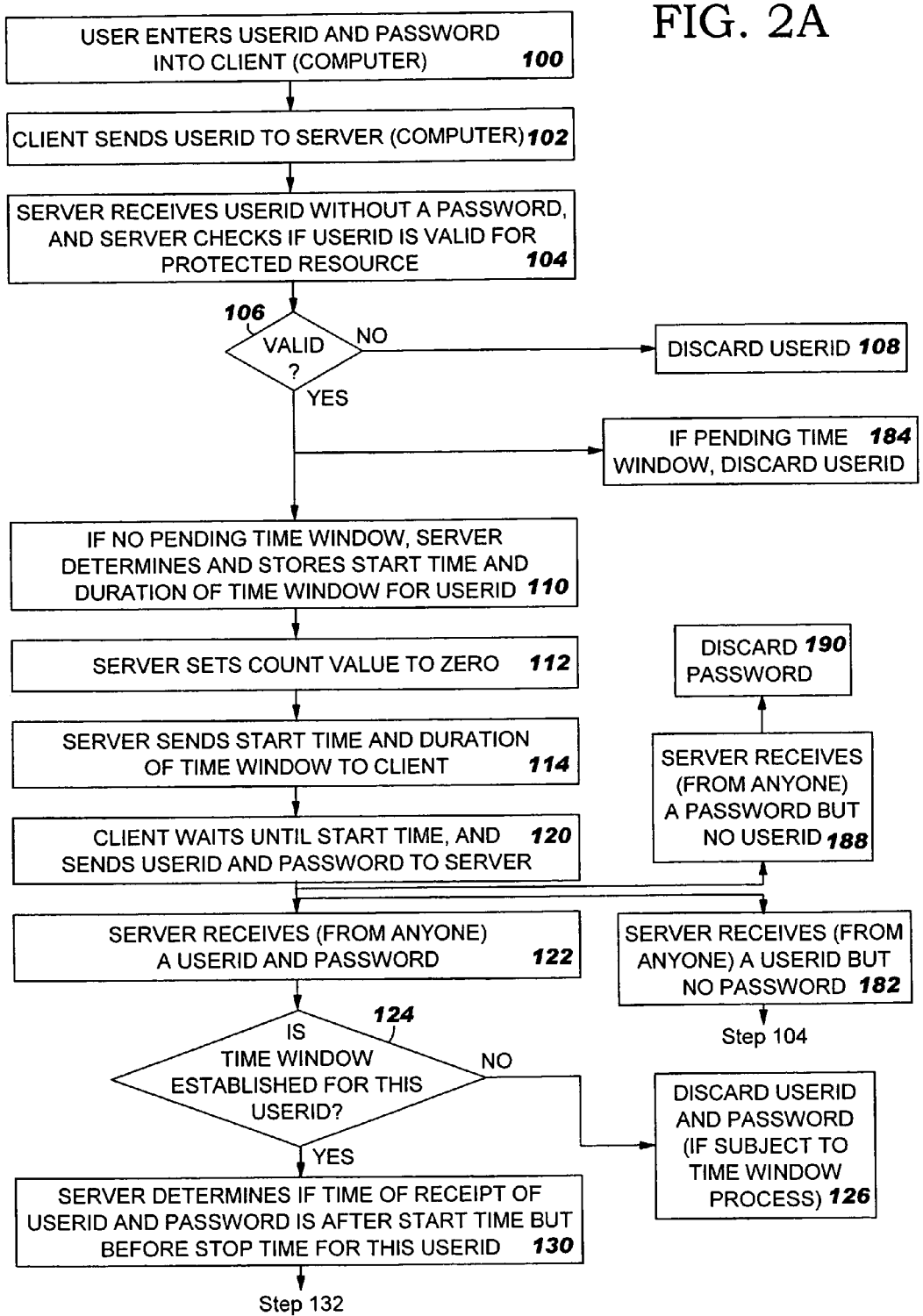
FIGS. 2(A) and 2(B) form a flow chart of a login attempt program in a client within the computer system of FIG. 1 and a login management program in a server within the computer system of FIG. 1, according to the present invention.
Figure 2B:
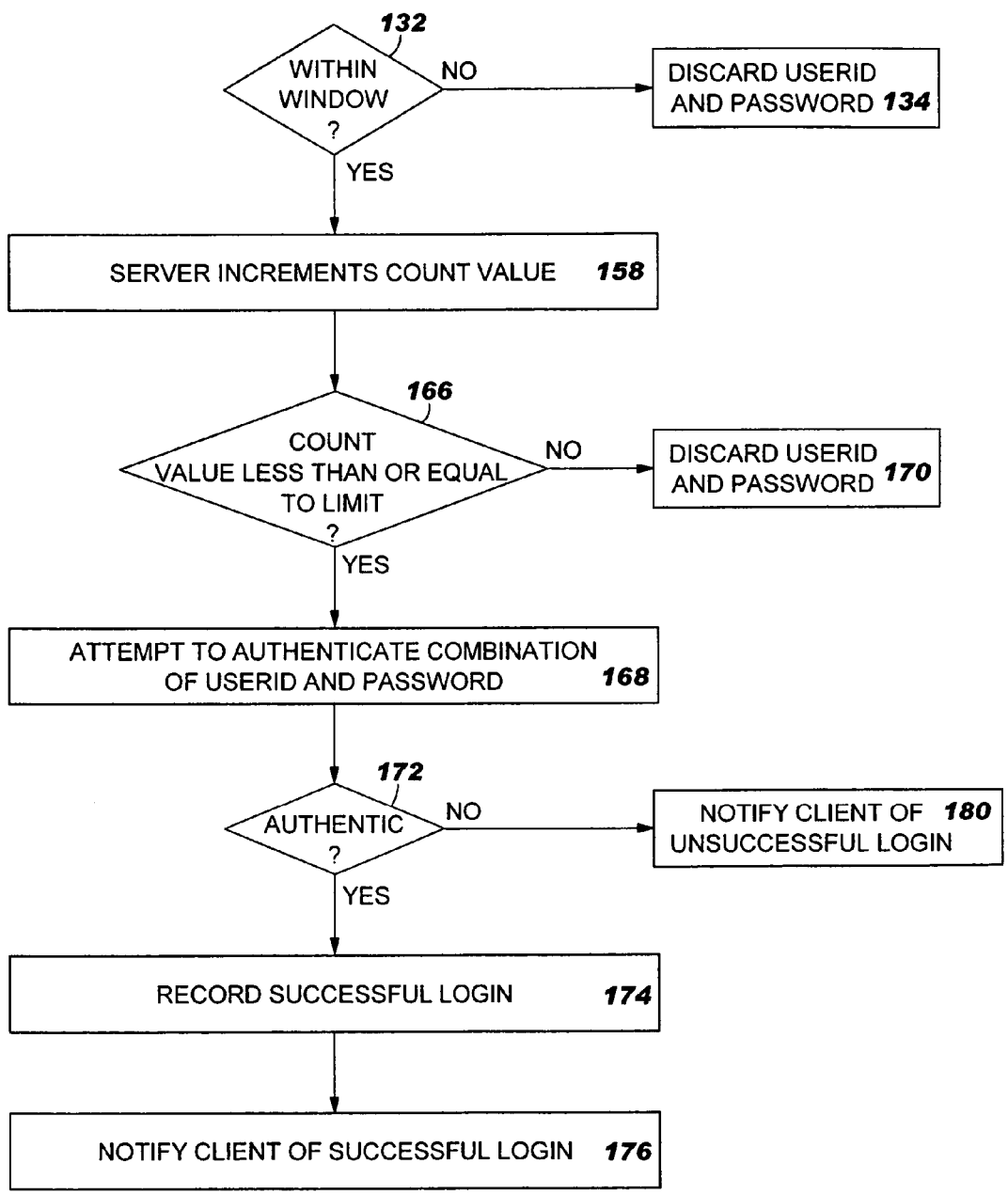

FIG. 2 illustrates the operation of the present invention including the function of login attempt programs 44a,b . . . c and login management program 70. When a user of the client 20a wants to access protected resource 66, the user initiates a login process to login to application 62 on server 30 to access resource 66 (although the following description is equally applicable if the user requested login to the operating system 58 on server 30). In step 100, the user invokes a login screen for application 62, and then supplies his or her userID and corresponding password to client 20a for login to application 62. The userID and corresponding password are forwarded to login attempt program 44a in association with an identifier for application 62. In response to receipt of the userID and password from the user, login program 44a sends the userID but not the password to server 30 (step 102). Login management program 70 within server 30 receives the userID. In response, login management program 70 checks a login management table 72 to determine if this userID is valid (step 104). Login management table 72 includes a list of userIDs that are valid for each protected resource. If the userID is not valid (decision 106, no branch), server 30 simply discards the received userID and takes no further action (step 108). In an alternate embodiment of the present invention, to prevent implied confirmation that a userID is valid (in case the userID was supplied by a hacker), login management program 70 responds to every userID supplied apart from a password (regardless of whether the userID is valid) with a start and stop time for a time window. However, if the userID is invalid, login management program 70 does not record the start and stop time and does not create a time window. Also, the start time is randomly generated to not reveal a start time for another, valid userID.

However, if the userID is valid (decision 106, yes branch), login management program 70 determines the start and stop times for a time window in which the login management program 70 will accept the password from the client 20a for this userID (step 110). Login management program 70 can determine the start and stop times for the time window in a variety of manners. In one embodiment of the present invention, the start and stop times are predetermined and fixed. For example, the start time can be five seconds after the current time and the stop time can be one second later. In another embodiment of the present invention, login management program 70 randomly determines the start time within bounds, for example, sometime between two and ten seconds after the current time, and the stop time can be a fixed time later, such as one second after the start time. Ideally, the duration of the time window is small (to filter out the vast majority of login attempts by entities that do not know the start and stop times). However, the duration of the time window should be large enough to accommodate transit times of a message between client 20a and server 30, and variations in the transit time. Likewise, the minimum start time must be sufficiently after the server 30 notifies the client 20a of the start time to accommodate transit times between client 20a and server 30, variations in the transit time and processing time within client 20a. Next, program management function records in table 72 for the userID, the start time and stop time, and initializes a "count" value to zero (steps 110 and 112). As explained in more detail below, the "count" value indicates the number of login attempts (such as a combination of userID and password or other password information) that are received by server 30 within the time window for this userID. The count value for a respective userID is used to enforce a limit on the number of login attempts that will be considered during the time window for the userID. Initially, the count value is set to zero to indicate that no login attempt (including a combination of userID and password) for this userID has yet been received during the time window. (The time window has not even begun yet.)

Next, the login management program 70 in server 30 sends the userID and start and stop times to the client 20a (step 114). Instead of sending the start and stop times to the client 20a, the server 30 may send a delay time (which is the start time minus the current time) and the window duration (which is the stop time minus the start time). Program management function 70 includes the userID in this transmission so client 20a can correlate the start and stop times with a specific user ID. In one embodiment of the present invention, the userID and start and stop times returned by the server 30 are not encrypted, but in another embodiment of the present invention, they are encrypted. In this other embodiment, the encryption key can be derived from the password, previously exchanged or obtained in some other known manner.

In response to receipt of the userID and start and stop times from server 30, login attempt program 44a within client 20a waits until the start time, and then proceeds with a login request to server 30. The login request includes some form of client/server authentication based on the user's password (step 120). For example, the login request can include the userID and corresponding password furnished earlier by the user. Alternately, the login request can include the userID and proof of password knowledge (supplied by a password-based client/server authentication protocol which does not send the password in clear).

Upon receipt of the login information (which includes the userID) from client 20a or any other entity (branch step 122), login management program 70 checks table 72 to determine if a time window has already been established and is in effect for this userID (decision 124). If not, login management program 70 discards the userID and password or other password information, if the object of the login attempt is to access a resource subject to time window access (step 126). (There may be other resources within server 30 that can be accessed by a valid login request at any time.) If the time window has been established and is in effect for this userID (decision 124, yes branch), login management program 70 checks the current time to determine if the userID and password or other password information have been received within the time window corresponding to this userID, i.e. after the start time but before the stop time (decision 130). If the current time is within the time window corresponding to this userID (decision 132, yes branch), login management program 70 increments the "count" value for this userID to indicate receipt of the login request during the corresponding time window (step 158). Then, login management program 70 compares the "count" value to an upper limit integer (decision 166). If the count value is less than or equal to the upper limit (decision 166, yes branch), then login management program 70 will accept the login request and proceed with login steps and authentication as described below (step 168). The "limit" used in decision 166 is selectable by an administrator of server 30. For example, if the limit is "one", only one login attempt (i.e. combination of userID and password) will be considered during the time window for the userID. However, the limit used in decision 166 can be larger so that receipt by server 30 of a single, invalid combination of userID and password (from an unauthorized entity) during the time window does not prevent client 20a from submitting and logging on with a valid combination of userID and password during the same time window. For example, if the limit is "two", then login management program 70 will consider for authentication two login attempts, i.e. two separate combinations of this userID and any password, during the time window for this userID.

After decision 166, yes branch (regardless of the limit used in decision 166), login management program 70 attempts to authenticate the combination of userID and password or other password information. For example, login management program 70 can attempt to authenticate the login attempt by checking whether the combination of userID and password exists in table 72 (step 168). If the combination exists in table 72 (or other login information is found to be authentic) (decision 172, yes branch), then the login attempt is valid, and login management program 70 records in table 72 that server 30 can establish a session with the client 20a to permit the user to access file 66 (step 174). Server 30 also notifies client 20a that the userID has been validated (step 176), so client 20a can proceed to begin the session with server 30. If desired, server 30 can also return a token to client 20a to use during the session to prove that the userID has been authenticated. Referring again to decision 172, no branch, where the combination of userID and password (or other login information) is not valid, then login management program 70 discards the combination of userID and password or other password information, and notifies the sender that the combination was invalid (step 180).

Refer again to decision 166, no branch, where the login request is received during the time window for the userID, but the count value is greater than the limit. In such a case, login management program 70 discards the userID and password or other password information; i.e. ignores the login request and does not attempt to authenticate the combination of userID and password or other password information (step 170). In such a case in the preferred embodiment of the present invention, login management program 70 will not notify the sender that the combination was not considered for authentication. In an alternative embodiment, login management program 70 will notify the sender that the combination was not considered for authentication.

Refer again to decision 132, no branch, where the login request is received before or after the time window corresponding to the userID. In such a case, login management program 70 simply discards the userID and password or other password information (step 134), and ignores the login attempt; i.e. login management program 70 does not attempt to validate the combination of userID and password or other password information, and does not permit access to the protected resource 66. In such a case in the preferred embodiment of the present invention, login management program 70 will not notify the sender that the combination was not considered for authentication. (When the userID and password or other password information (valid or invalid) are received before or after the time window, login management program 70 does not increment the count value for this userID.) In the preferred embodiment of the present invention, only the receipt of combinations of userIDs and passwords (valid or invalid) during the time window, causes incrementing of the count value. This prevents excessive login attempts outside the time window from causing denial of service to the userID.

If server 30 receives another userID without a password (branch step 182), server 30 processes this userID by jumping to step 104 described above. If the userID is valid, but there is already an established time window which is not yet completed, i.e. a "pending" time window, for this userID, then login management program 70 discards the userID and does not recalculate or reset the time window (step 184). This makes it more difficult for the hacker to implement a denial of service attack by repeatedly sending the same, valid userID. According to the present invention, this will not prevent the time window from beginning, for the real user.

If server 30 receives a password or other password information without a userID (branch step 188), login management program 70 discards the password (step 190). In the preferred embodiment of the present invention, no attempt is made for authentication of the password because the password or other password information is not directly correlated with a userID. Also, server 30 does not increment any count value for any userID. This is to avoid a focussed denial of service attack and because the password is not directly correlated with a userID; without the userID, it is difficult to identify the corresponding count value.

Based on the foregoing, a system, method and computer program for filtering out login attempts by unauthorized entities have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for authenticating a user of a client computer to a remote server computer, said method comprising the steps of:

inputting, by said user, a userID and a corresponding password into said client computer, wherein said userID is separate and distinct from said corresponding password;

said client computer initially sending said userID but not said corresponding password of said user to said remote server computer for authentication of said user;

in response to receipt of said userID without said corresponding password, said remote server computer determining a subsequent time window during which said remote server computer will consider for authentication submission of a combination of said userID and said corresponding password, and said remote server computer subsequently notifying said client computer of said time window determined, wherein said remote server computer determines a start time of said time window based on a randomly generated number between two and ten seconds after receipt of said userID from said client computer, and wherein said remote server initializes a count value corresponding to a number of login attempts received for said userID within said time window determined;

after receipt of said notification from said remote server computer and during said time window determined, said client computer sending said userID and said corresponding password inputted by said user to said remote server computer; and in response to receipt of said userID and said corresponding password from said client computer, said remote server computer determining if said combination of said userID and said corresponding password is valid and within a preset limit number of login attempts established for said userID.

2. A method as set forth in claim 1, wherein if said combination of said userID and said corresponding password is valid and within said preset limit number of login attempts established for said userID, said remote server computer subsequently notifies said client computer that said combination of said userID and said corresponding password is valid, and in response, said client computer establishes a session with said remote server computer and accesses a resource requiring a valid combination of said userID and said corresponding password to access said resource.

3. A method as set forth in claim 1, further comprising the step of:

said remote server computer also receiving submission of said combination of said userID and said corresponding password before said time window, and in response, said remote server computer disregarding said submission of said combination of said userID and said corresponding password received before said time window such that said remote server computer does not attempt to validate said combination of said userID and said corresponding password received before said time window and does not use said combination of said user ID and said corresponding password received before said time window to grant access to said resource.

4. A method as set forth in claim 1, further comprising the step of:

said remote server computer also receiving submission of said combination of said userID and said corresponding password after said time window, and in response, said remote server computer disregarding said submission of said combination of said userID and said corresponding password received after said time window such that said remote server computer does not attempt to validate said combination of said userID and said corresponding password received after said time window and does not use said combination of said user ID and said corresponding password received after said time window to grant access to said resource.

5. A method as set forth in claim 1, wherein said combination of said userID and said corresponding password is not valid, and further comprising the subsequent steps of:

said remote server computer receiving another combination of said userID and another password during said time window after said receipt of said userID and said corresponding password during said time window, said another combination of said userID and said another password being valid, and in response, said remote server computer disregarding said another combination of said userID and said another password received during said time window such that said remote server computer does not attempt to validate said another combination of said userID and said another password received during said time window and does not use said another combination of said user ID and said another password received during said time window to grant access to said resource.

6. A server computer for authenticating a user of a client computer to said server computer, said server computer being remote from said client computers said server computer comprising:

means for initially receiving from said client computer a userID but not a corresponding password of said user, wherein said userID is separate and distinct from said corresponding password;

in response to receipt of said userID without said corresponding password, means for determining a subsequent time window during which said server computer will consider for authentication submission of a combination of said userID and said corresponding password, and subsequently notifying said client computer of said time window determined, wherein said means for determining include means for determining a start time of said time window based on a randomly generated number between two and ten seconds after receipt of said userID from said client computer, and wherein said means for determining include means for initializing a count value corresponding to a number of login attempts received for said userID within said time window determined;

after receipt of said notification from said server computer of said time window determined by said server computer and during said time window, means for receiving said userID and said corresponding password from said client computer; and in response to receipt of said userID and said corresponding password or other authentication, means for determining if said combination of said userID and said corresponding password is valid and within a preset limit number of login attempts established for said userID.

7. A server computer as set forth in claim 6, wherein if said combination of said userID and said corresponding password is valid and within said preset limit number of login attempts established for said userID, means for notifying said client computer that said combination of said userID and said corresponding password is valid, and establishing a session with said client computer to enable said client computer to access a resource requiring a valid combination of said userID and said corresponding password to access said resource.

8. A server computer as set forth in claim 6, further comprising:

means for receiving submission of said combination of said userID and said corresponding password before said time window, and in response, disregarding said submission of said combination of said userID and said corresponding password received before said time window such that said server computer does not attempt to validate said combination of said userID and said corresponding password received before said time window and does not use said combination of said user ID and said corresponding password received before said time window to grant access to said resource.

9. A server computer as set forth in claim 6, further comprising:
   means for receiving submission of said combination of said userID and said corresponding password after said time window, and in response, disregarding said submission of said combination of said userID and said corresponding password received after said time window such that said server computer does not attempt to validate said combination of said userID and said corresponding password received after said time window and does not use said combination of said user ID and said corresponding password received after said time window to grant access to said resource.

10. A server computer as set forth in claim 6, wherein said combination of said userID and said corresponding password is not valid, and further comprising:
   means for receiving another combination of said userID and another password during said time window after said receipt of said userID and said corresponding password during said time window, said another combination of said userID and said another password being valid, and in response, disregarding said another combination of said userID and said another password received during said time window such that said server computer does not attempt to validate said other combination of said userID and said another password received during said time window and does not use said another combination of said user ID and said another password received during said time window to grant access to said resource.

11. A computer program product for execution in a remote server computer to authenticate a user of a client computer to said remote server computer, said computer program product comprising:
   a computer readable storage medium;
   first program instructions to receive from said client computer a userID but not a corresponding password of said user, said userID being separate and distinct from said corresponding password;
   second program instructions, responsive to said userID without said corresponding password received, to determine a subsequent time window during which said remote server computer will consider for authentication submission of a combination of said userID and said corresponding password, and to subsequently notify said client computer of said time window determined, wherein said second program instructions include instructions to determine a start time of said time window based on a randomly generated number between two and ten seconds after receipt of said userID from said client computer, and wherein said second program instructions include instructions to initialize a count value corresponding to a number of login attempts received for said userID within said time window determined;
   third program instructions to receive from said client computer during said time window, said userID and said corresponding password; and
   fourth program instructions, responsive to receipt of said userID and said corresponding password from said client computer, to determine if said combination of said userID and said corresponding password is valid and within a preset limit number of login attempts established for said userID; and wherein said first, second, third and fourth program instructions are recorded on said storage medium.

12. A computer program product as set forth in claim 11, wherein if said combination of said userID and said corresponding password is valid and within said preset limit number of login attempts established for said userID, fifth program instructions to notify said client computer that said combination of said userID and said corresponding password is valid, and sixth program instructions to establish a session with said remote server computer to permit said client computer to access a resource requiring a valid combination of said userID and said corresponding password to access; and wherein said fifth and sixth program instructions are recorded on said storage medium.

13. A computer program product as set forth in claim 11, further comprising: fifth program instructions to receive submission of said combination of said userID and said corresponding password before said time window, and in response, disregard said submission of said combination of said userID and said corresponding password received before said time window such that said remote server computer does not attempt to validate said combination of said userID and said corresponding password received before said time window and does not use said combination of said user ID and said corresponding password received before said time window to grant access to said resource; and wherein said fifth program instructions are recorded on said storage medium.

14. A computer program product as set forth in claim 11, further comprising: fifth program instructions to receive submission of said combination of said userID and said corresponding password after said time window, and in response, disregard said submission of said combination of said userID and said corresponding password received after said time window such that said remote server computer does not attempt to validate said combination of said userID and said corresponding password received after said time window and does not use said combination of said user ID and said corresponding password received after said time window to grant access to said resource; and wherein said fifth program instructions are recorded on said storage medium.

15. A computer program product as set forth in claim 12, wherein said combination of said userID and said corresponding password is not valid, and further comprising:
   fifth program instructions to receive another combination of said userID and another password during said time window after said receipt of said userID and password during said time window, said other combination of said userID and said another password being valid, and in response, to disregard said other combination of said userID and said another password received during said time window such that said remote server computer does not attempt to validate said another combination of said userID and said another password received during said time window and does not use said another combination of said user ID and said another password received during said time window to grant access to said resource; and wherein said fifth program instructions are recorded on said storage medium.

* * * * *